United States Patent [19]
Mattia et al.

[11] 3,836,101
[45] Sept. 17, 1974

[54] AIRCRAFT CARGO RAMP SYSTEM

[75] Inventors: Armand D. Mattia; Bruno W. Bracka, both of La Mesa, Calif.

[73] Assignee: General Dynamics Corporation, San Diego, Calif.

[22] Filed: Apr. 26, 1973

[21] Appl. No.: 354,836

[52] U.S. Cl. ............................ 244/137 R, 14/71
[51] Int. Cl. ............................................. B64c 1/22
[58] Field of Search ...... 14/71, 72; 244/139 R, 118; 214/44, 85; 193/35

[56] References Cited
UNITED STATES PATENTS

| | | | |
|---|---|---|---|
| 1,778,667 | 10/1930 | French | 14/71 |
| 2,188,554 | 1/1940 | Marianno | 14/71 X |
| 2,523,723 | 9/1950 | Santee | 214/85 |
| 2,677,141 | 5/1954 | Senn | 14/71 |
| 2,942,812 | 6/1960 | Pauli | 244/118 |
| 3,440,782 | 4/1969 | Stone | 14/71 X |

*Primary Examiner*—Nile C. Byers, Jr.
*Attorney, Agent, or Firm*—John R. Duncan; Hugo F. Mohrlock

[57] ABSTRACT

A cargo ramp system suitable for use with the rear fuselage of low-wing jet transports. The ramp includes a forward ramp section hinged to the aft end of the fixed cargo floor and an aft ramp section pivotally mounted on the fuselage structure. The two sections form a unitary ramp when extended. In flight, the forward section forms an integral part of the cargo floor and the aft section forms an integrap part of the fuselage. During unloading or loading, the forward section is movable to selectively align either with the main cargo floor or with the main ramp section.

7 Claims, 7 Drawing Figures

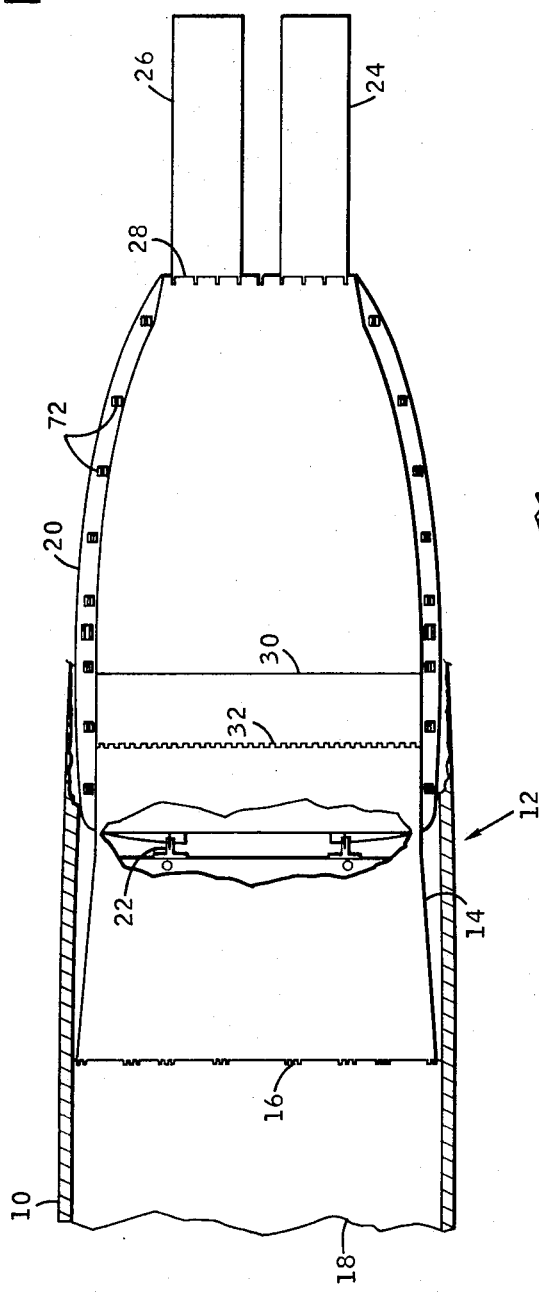
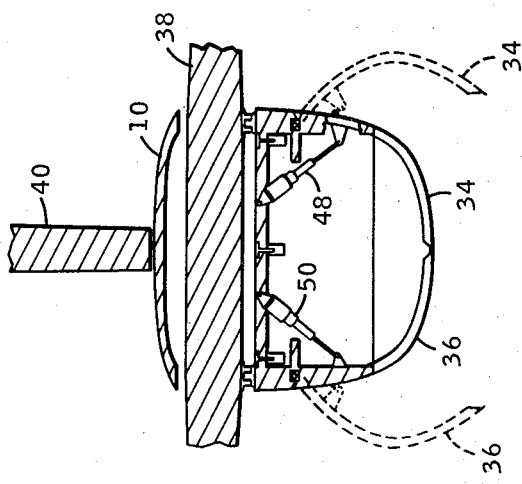
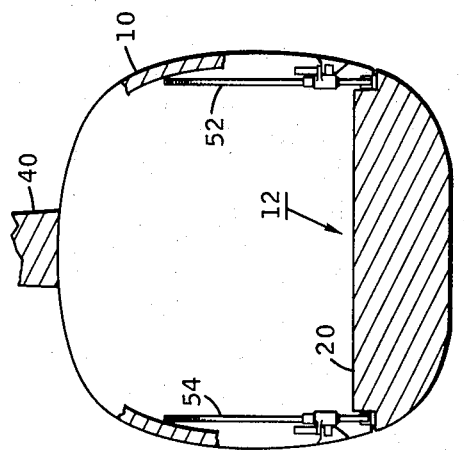
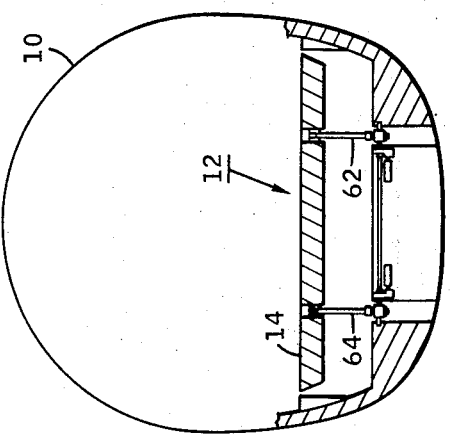
FIG. 4
FIG. 5
FIG. 6
FIG. 7

AIRCRAFT CARGO RAMP SYSTEM

BACKGROUND OF THE INVENTION

This invention relates to transport aircraft cargo handling and, more particularly, to an aircraft-carried rear fuselage cargo ramp system for low-wing jet transports.

The floor of the cargo compartment in low-wing jet transport aircraft tends to be relatively high above the ground. Often, appropriate cargo handling equipment to unload such aircraft is not available. Thus, it is highly desirable that the aircraft carry with it the necessary ramp and associated equipment to permit loading and unloading from ground level or truck bed height.

Attempts have been made to meet this need by providing doors at the rear of the fuselage and a simple ramp carried in the aft cargo compartment which can be extended for cargo loading. A typical ramp of this sort, which is hinged downwardly from the aft fuselage, is shown in U.S. Pat. No. 3,147,942. While this arrangement is useful with high wing, low-fuselage aircraft, the slope of a simple single ramp of reasonable length would be too steep with a higher fuselage aircraft. Also, an excessive proportion of the cargo space would be used in storing a longer ramp internally. A typical internally stored ramp is shown in U.S. Pat. No. 2,942,812. Such an arrangement is wasteful of cargo space and is not long enough for use where the cargo floor is relatively high.

In most prior systems, much of the ramp and associated equipment serve only the cargo handling function. Preferably, this equipment will have other functions to decrease the weight and space penalties paid for the convenience of the on-board cargo handling capability.

Where a short, steep ramp is used in a high-fuselage aircraft, there are problems in moving cargo over the threshold between the steeply angled ramp and the horizontal cargo floor. While outside conveyor systems have tiltable platforms (such as those shown in U.S. Pat. No. 3,589,400) to handle such transitions in conveyor angle, these systems have been large, heavy and complicated and, therefore, have not been considered suitable for an integral aircraft cargo handling system.

Thus, there is a continuing need for improved aircraft cargo handling ramps and associated equipment.

SUMMARY OF THE INVENTION

An object, therefore, of this invention is to provide an aircraft cargo ramp system overcoming the above-noted problems.

Another object of this invention is to provide an aircraft cargo ramp system suitable for use with low-wing, high cargo floor aircraft.

Still another object of this invention is to provide a low weight aircraft cargo ramp system occupying a minimum of useful cargo space.

A further object of this invention is to provide an aircraft cargo handling system including a threshold area which can be selectively aligned with either a cargo floor or ramp.

The above objects, and others, are accomplished, basically, by an aircraft cargo handling system which includes a two-part ramp system which is extendable from the rear fuselage of the aircraft. The ramp system includes a forward ramp section hinged to the aft end of the fixed aircraft cargo floor and an aft ramp section pivotally mounted on the aircraft fuselage. During loading and unloading operations, the aft section may be aligned with a truck bed or with the ground. A pair of treadways are preferably mounted on the outer end of the aft section when loading or unloading directly from ground level. The forward section is selectively alignable with the aircraft cargo floor and with the aft ramp section to facilitate movement of cargo across the threshold between cargo floor and ramp system. In flight, the forward section is positioned in alignment with the fixed cargo floor and becomes in effect part of the cargo compartment floor, while the aft section becomes an integral part of the fuselage, acting as a door closing off the loading access opening.

BRIEF DESCRIPTION OF THE DRAWING

Details of a preferred embodiment of the present invention will be further understood upon reference to the drawing, wherein:

FIG. 4 is a sectional view taken on line 4—4 in FIG. 2, showing the ramp system with treadways installed;

FIG. 5 is a sectional view taken through the fuselage on line 5—5 in FIG. 3;

FIG. 6 is a sectional view taken through the fuselage on line 6—6 in FIG. 3; and FIG. 7 is a sectional view taken through the fuselage on line 7—7 in FIG. 3.

DETAILED DESCRIPTION OF THE INVENTION

Figure 1:
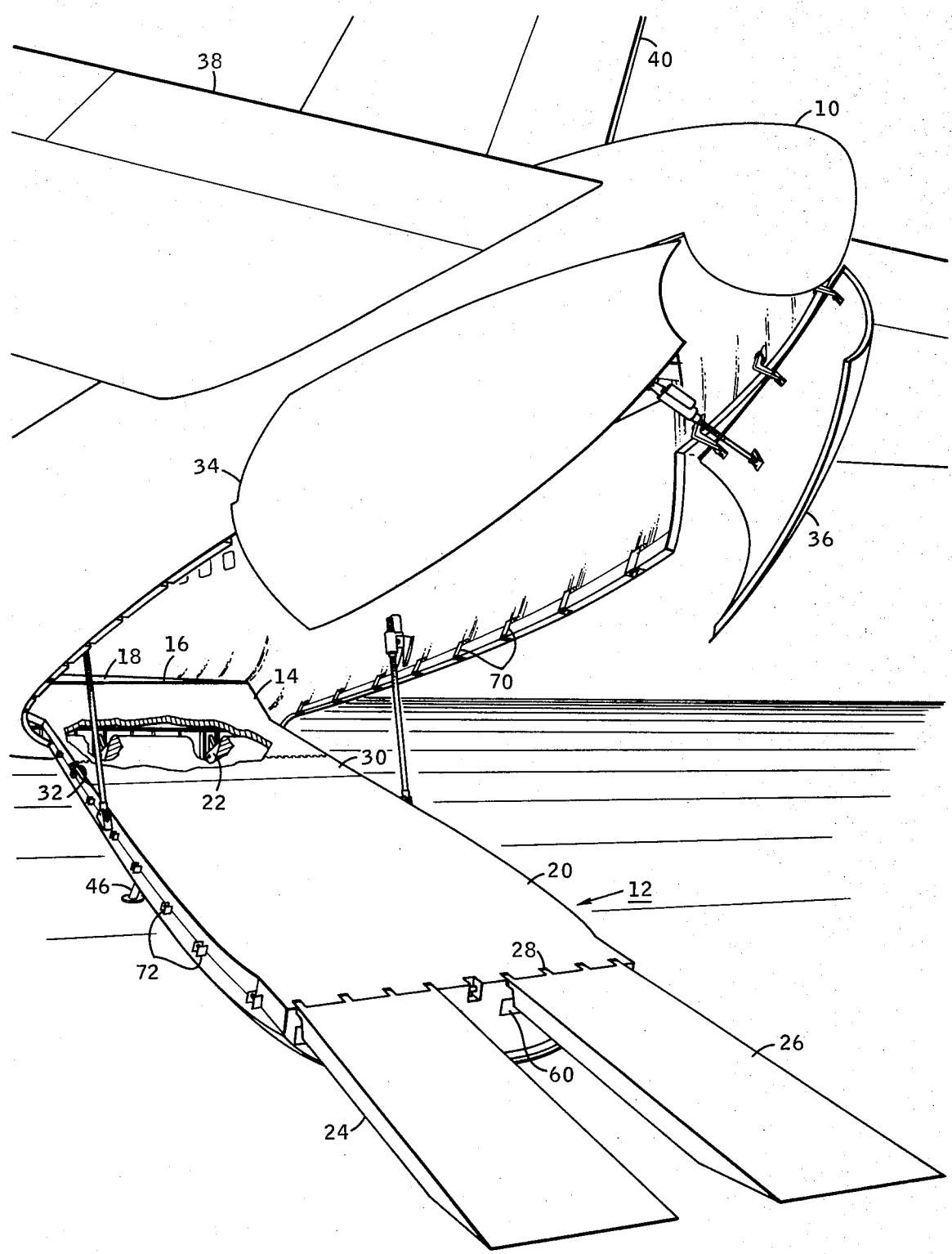
FIG. 1 is a perspective view of the rear fuselage of an aircraft, partially cut away to show the cargo ramp system.

Referring now to FIG. 1, there is seen a perspective view, somewhat simplified for claity, of the aft fuselage 10 of a transport aircraft showing the novel cargo ramp system 12 extended for loading or unloading from ground level.

Cargo ramp system 12 includes a forward ramp section 14 hinged at 16 to the aircraft cargo floor 18, an aft ramp section 20 hinged to the fuselage structure at 22 and a pair of treadways 24 and 26 removably hinged to the after end of aft section 20 at 28.

A treadplate 30, hinged to forward section 14 at 32, covers the gap between forward section 14 and aft section 20 and provides a smooth transition should the two sections be positioned at different slope angles.

Figure 2:
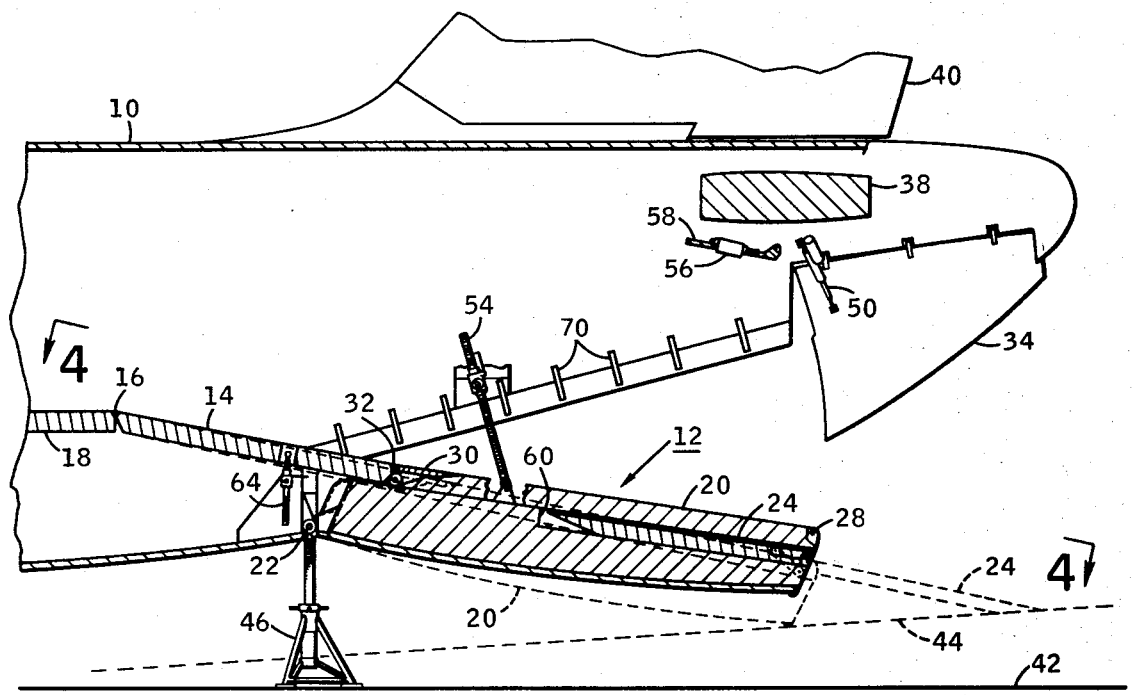
FIG. 2 is a vertical section through the rear fuselage taken substantially along the aircraft centerline showing the cargo ramp system deployed for loading.

A pair of doors 34 and 36 at the extreme aft end of fuselage 10 are operable as shown in FIGS. 1, 2 and 7 to provide sufficient vertical clearance for the movement of cargo along the ramp system. Above doors 34 and 36, horizontal stabilizer 38 and vertical stabilizer 40 are secured to fuselage 10.

Figure 3:
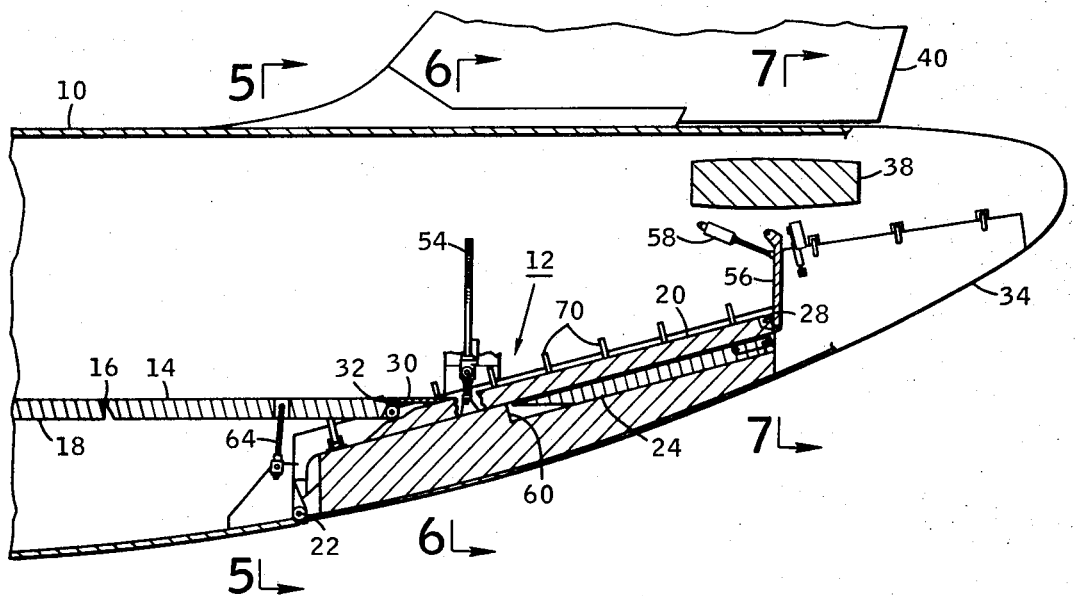
FIG. 3 is a vertical section through the rear fuselage taken substantially along the aircraft centerline, showing the cargo ramp system stowed for flight.

As seen in FIGS. 2 and 3, the ramp system is movable between an extended, cargo handling, position (FIG. 2) and a stowed, flight, position (FIG. 3). FIG. 2 shows the ramp system in solid lines extended at a height suitable for receiving cargo from a truck bed and in phantom extended for handling cargo at ground level. Ground level is indicated at 42 for handling cargo from a truck bed and at 44 for ground handling. A support jack 46 is provided to support aft fuselage 10 during movement of heavy cargo along ramp system 12. For ground handling of cargo, the aircraft nosewheel (not shown) is extended, tilting the aircraft rearwardly so that the actual ground line will be at 44.

When an aircraft arrives to receive or discharge cargo, the ramp system 12 is stowed as shown in FIG. 3. Doors 34 and 36 are opened by conventional pneumatic or hydraulic actuators 48 and 50, moving the doors from the solid line to the phantom position as seen in FIG. 7. Jack 46 is installed, if needed, then aft ramp section 20 is lowered by conventional actuators 52 and 54 (illustrated as screw actuators) to the desired position for ground or truck bed loading. If desired, the aircraft nosewheel (not shown) can be extended to effectively further lower the ramp. For ground loading, treadways 24 and 26 are removed from storage compartments 60 and installed on hinges 28, as indicated in phantom.

Pressure bulkhead 56 is moved forwardly by actuator 58 from the position shown in FIG. 3 to that shown in FIG. 2 to give sufficient vertical clearance for cargo handling.

To commence unloading, cargo is moved to forward ramp section 14 from cargo floor 18 (or, cargo could have been transported already on forward section 14). Forward ramp actuators 62 and 64, as seen in FIGS. 2, 3 and 5 (here, a conventional screw actuator) is operated to lower forward section 14 until treadway 30 engages aft section 20. The cargo is then moved down the ramp to a truck bed or ground. Additional cargo can be directly moved out from the cargo floor 4 with forward section 14 down if movement over the threshold causes no problems, or forward section 14 can be raised to a horizontal position to receive each unit of cargo. This avoids moving cargo, such as large crates or containers, over the threshold at hinge 16 in FIG. 2. This load leveling ability of forward section 14 greatly facilitates cargo handling.

To reload the aircraft, cargo is moved up ramp system 12 to cargo floor 18. Again forward section 14 can be raised with cargo in place from the position shown in FIG. 2 to that shown in FIG. 3, to avoid direct cargo movement over the angled threshold between forward section 14 and cargo floor 18. Treadplate 30 serves to compensate for misalignment of forward and aft ramp sections 14 and 20 and to smooth the movement of cargo between them. When the aircraft cargo floor is filled with cargo, the last major cargo units can be left in place on forward ramp section 14. Further, lightweight cargo can be secured to aft ramp section 20 to maximize the use of the aircraft cargo carrying capability.

In preparing for flight, first treadways 24 and 26, if used, are lifted off hinges 28 and reinserted in storage compartments 60. The hinge 28 is formed by hook-like extensions at the forward ends of the treadways placed over a transverse bar at the after end of aft ramp 20. A spring-loaded transverse bar 66 is positioned at the after end of storage compartment 60. The inclined ends of treadways deflect bar 66 downwardly as the treadways 24 and 26 are pushed into compartment 60. Upon full insertion, the bar 66 engages the hook-like extensions at the forward ends of the treadways to hold them in place.

Jack 46, if used, is removed and the nosewheel (not shown), if overextended, is returned to the normal position.

Actuators 62 and 64 are operated to return forward ramp section 14 to the position illustrated in FIGS. 3 and 5. Cargo may be in place on ramp section 14 during this movement and may be transported thereon.

Actuator 58 is then operated to return pressure bulkhead 56 to the position shown in FIG. 3. Actuators 52 and 54 are then operated to move aft ramp section 20 up to the position shown in FIGS. 3 and 6. Aft section 20 is then locked in place by a plurality of conventional latch members schematically illustrated at 70 and 72. The aft ramp section 20 forms part of the outer fuselage structure and is designed to carry pressurization loads for pressurized aircraft. Lightweight cargo may be placed on the sloping internal surface of aft section 20.

Finally, actuators 48 and 50 are operated to move doors 34 and 36 from the position shown in FIG. 2 and in phantom in FIG. 7 to the position shown in FIG. 3 and in solid lines in FIG. 7. The aircraft is then ready for movement.

While certain specific proportions and components are provided in the above description of a preferred embodiment, these may be varied within the scope of this disclosure with similar results. Other applications, modifications and ramifications of the present invention will become apparent to those skilled in the art upon reading this disclosure. These are intended to be included within the scope of this invention, as defined in the appended claims.

We claim:

1. An aircraft cargo ramp system comprising:

a forward ramp section hinged to the aft end of an aircraft main cargo floor;

an aft ramp section adapted to meet the after end of said forward ramp section to effectively form a continuous long ramp;

actuator means operatively connected to each of said two ramp sections to independently move each of said two ramp sections between at least a first stowed position and a second cargo handling position;

latch means connectable between said sections and aircraft structure to support said sections in said stowed position wherein said forward section lies substantially in the plane of the main cargo floor and serves as an extension of said main cargo floor;

means to support said sections in said cargo handling position wherein both ramp sections slope downwardly from the after end of said aircraft cargo floor outwardly through an opening in the aircraft fuselage to facilitate movement of cargo into and out of the aircraft;

said actuator means operatively connected to said forward section to move said forward section between said position in the plane of said main cargo floor and said sloping cargo handling position while cargo is in place on said forward section, whereby cargo can be moved into and out of the aircraft without directly passing over an angled threshold between said forward ramp section and the main cargo floor.

2. The ramp system according to claim 1 wherein in said stowed position said aft ramp section serves to close at least part of said fuselage opening.

3. The ramp system according to claim 1 including at least one treadway and means to connect said at least one treadway to the after end of said aft section to effectively extend the length of said ramp system.

4. The ramp system according to claim 3 wherein said aft section includes a storage compartment for said at least one treadway.

5. The ramp system according to claim 1 further including a treadplate hingedly connected to the aft end of said forward section and adapted to bridge a gap between the upper surfaces of said forward and aft section.

6. The ramp system according to claim 1 wherein said actuator is adapted to selectively position and hold the after end of said aft section in a plurality of positions including a position at ground level and a position at truck-bed height above the ground.

7. An aircraft cargo ramp system comprising:
 a first ramp section hinged at a first hinge to an edge of an aircraft main cargo floor;
 a second ramp section hinged at a second hinge to the structure of said aircraft adjacent to said first ramp section;
 first actuator means operatively connected to said second ramp section and said aircraft structure to rotate said second ramp section about said second hinge between at least a first stowed position and a second cargo handling position, sloping downwardly away from said aircraft;
 second actuator means operatively connected to said first ramp section and said aircraft structure to rotate said first ramp about said first hinge between at least a first stowed position in which said first ramp lies substantially in the plane of said main cargo floor and serves as an extension of the main cargo floor and a second cargo handling position in which said first ramp lies substantially in the plane of said second ramp section when said second ramp section is in the cargo handling position; and
 said second actuator means further adapted to move said first ramp section between said position substantially in the plane of said main cargo floor and said second cargo handling position while cargo is in place on said first ramp section, whereby cargo may be moved into and out of the aircraft without directly passing over an angled threshold between said cargo floor and ramp system.

* * * * *